(12) United States Patent
Fischer

(10) Patent No.: US 12,704,823 B2
(45) Date of Patent: Aug. 11, 2026

(54) METHODS AND SYSTEMS FOR PROVIDING DATA FROM AN INTERNAL DATA PROCESSING SYSTEM OF AN INDUSTRIAL PLANT TO AN EXTERNAL DATA PROCESSING SYSTEM

(71) Applicant: Siemens Aktiengesellschaft, Munich (DE)

(72) Inventor: Jan-Gregor Fischer, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 612 days.

(21) Appl. No.: 17/780,884

(22) PCT Filed: Oct. 29, 2020

(86) PCT No.: PCT/EP2020/080425
§ 371 (c)(1),
(2) Date: May 27, 2022

(87) PCT Pub. No.: WO2021/104793
PCT Pub. Date: Jun. 3, 2021

(65) Prior Publication Data

US 2023/0022849 A1 Jan. 26, 2023

(30) Foreign Application Priority Data

Nov. 28, 2019 (EP) .................................... 19212182

(51) Int. Cl.
*H04L 9/40* (2022.01)
*G05B 19/05* (2006.01)
(Continued)

(52) U.S. Cl.
CPC ....... *G05B 19/058* (2013.01); *G05B 19/4183* (2013.01); *G05B 19/4185* (2013.01);
(Continued)

(58) Field of Classification Search
None
See application file for complete search history.

(56) References Cited

U.S. PATENT DOCUMENTS 6,105,027 A * 8/2000 Schneider ............ H04L 63/102 707/999.009
10,491,569 B1 11/2019 Powell, III
(Continued)

FOREIGN PATENT DOCUMENTS

CN 1529837 A 9/2004 ........... G05B 19/418
CN 2340499 A 2/2012 ............ H04L 29/06
(Continued)

OTHER PUBLICATIONS

Wang Yubin et al: "Information Security Protection in Software Testing", Dec. 31, 2018.
(Continued)

*Primary Examiner* — Lance Leonard Barry
(74) *Attorney, Agent, or Firm* — Henry M. Feiereisen LLC

(57) ABSTRACT

Data are sent from an internal data processing system of an Industrial plant to an external data processing system of the industrial plant by generating with an industrial edge device data packets from data related to an industrial machine, and generating therefrom signed data packets signed with a first digital signature. While the signed data packet are read, a user-defined data filter is applied, which either passes or rejects the signed data packets. The data packets that passed the user-defined data filter are then sent to the external data processing system. In addition, double-signed data packets are produced by signing the signed data packets that pass the user-defined data filter with a second digital signature.

21 Claims, 4 Drawing Sheets

(51) Int. Cl.
*G05B 19/418* (2006.01)
*H04L 67/10* (2022.01)
*H04L 67/12* (2022.01)

(52) U.S. Cl.
CPC ...... *H04L 63/0236* (2013.01); *H04L 63/0428* (2013.01); *H04L 63/12* (2013.01); *H04L 67/10* (2013.01); *H04L 67/12* (2013.01)

(56) References Cited

U.S. PATENT DOCUMENTS

| | | | | |
|---|---|---|---|---|
| 10,742,420 | B1 * | 8/2020 | Griffin | H04L 9/3093 |
| 2006/0041326 | A1 | 2/2006 | Kreidler et al. | |
| 2006/0161773 | A1 * | 7/2006 | Okazaki | G06F 21/79<br>713/168 |
| 2008/0196085 | A1 * | 8/2008 | Nagoya | H04L 65/1069<br>726/3 |
| 2010/0165878 | A1 * | 7/2010 | Soni | H04L 67/12<br>370/254 |
| 2012/0066503 | A1 | 3/2012 | Koppers | |
| 2013/0094376 | A1 * | 4/2013 | Reeves | H04L 63/1408<br>370/252 |
| 2016/0277191 | A1 | 9/2016 | Lee et al. | |
| 2017/0195265 | A1 | 7/2017 | Billi et al. | |
| 2017/0344703 | A1 | 11/2017 | Ansari et al. | |
| 2017/0374027 | A1 | 12/2017 | Fischer et al. | |
| 2018/0107178 | A1 | 4/2018 | Nixon et al. | |
| 2018/0131525 | A1 | 5/2018 | Kass | |
| 2020/0036610 | A1 * | 1/2020 | Indiresan | H04L 63/20 |
| 2020/0128042 | A1 * | 4/2020 | Ochoa | H04L 9/3247 |
| 2020/0192344 | A1 * | 6/2020 | O'Connor | G05B 23/0221 |
| 2020/0322176 | A1 * | 10/2020 | Bhandari | H04L 9/0825 |
| 2021/0021571 | A1 * | 1/2021 | Kim | H04L 63/101 |
| 2021/0350180 | A1 * | 11/2021 | Oleson | G06N 3/096 |
| 2022/0006653 | A1 * | 1/2022 | Ghetie | G06F 21/575 |

FOREIGN PATENT DOCUMENTS

| | | | | |
|---|---|---|---|---|
| CN | 102340499 | A | 2/2012 | |
| CN | 107026894 | A | 8/2017 | H04L 29/08 |
| CN | 110376990 | A | 10/2019 | G05B 19/418 |
| KR | 20170110157 | A | 10/2017 | |

OTHER PUBLICATIONS

Yin Jiating et al: "A Research and Implementation of Data Interface Security based on Hybrid Encryption Algorithm",DOI:10.3969/j.issn.2095-3771.2019.08.010, Jul. 29, 2019.

College of Network Engineering, Wuhu Institute of Technology, Wuhu 241003, Jun. 29, 2019, Yin Jiau-Ting et al et al "A Research and Implementation of Data Interface Security based on Hybrid Encryption Algorithm", pp. 41-44, 1-21.

2018 14$^{th}$ International Conference on Computational Intelligence and Security (CIS), Dec. 31, 2018, Y. Wang "Information Security Protection in Software Testing", pp. 449-452, 1-21.

PCT International Search Report and Written Opinion of International Searching Authority mailed Jan. 26, 2021 corresponding to PCT International Application No. PCT/EP2020/080425 filed Oct. 29, 2020.

* cited by examiner

METHODS AND SYSTEMS FOR PROVIDING DATA FROM AN INTERNAL DATA PROCESSING SYSTEM OF AN INDUSTRIAL PLANT TO AN EXTERNAL DATA PROCESSING SYSTEM

CROSS-REFERENCES TO RELATED APPLICATIONS

This application is the U.S. National Stage of International Application No. PCT/EP2020/080425, filed Oct. 29, 2020, which designated the United States and has been published as International Publication No. WO 2021/104793 A1 and which claims the priority of European Patent Application, Serial No. 19212182.0, filed Nov. 28, 2019, pursuant to 35 U.S.C. 119(a)-(d).

BACKGROUND OF THE INVENTION

The invention relates to a method for providing data from an internal data processing system of an industrial plant to an external data processing system, wherein the internal data processing system comprises at least one industrial edge device and at least one, particularly a plurality of, industrial machine(s), e.g. machine tools, in particular cutting, boring, grinding, shearing machine tools.

Furthermore, the invention relates to a data processing module for providing data from an internal data processing system of an industrial plant to an external data processing system, wherein the internal data processing system comprises at least one industrial edge device and at least one industrial machine.

Moreover, the invention relates to an industrial edge device and to an industrial data processing system with at least one above-mentioned data processing module.

In addition, the invention relates to a computer program comprising instructions to cause the above-mentioned industrial data processing system to execute the steps of the above-mentioned method and to a computer-readable medium having stored thereon such computer program.

An industrial network environment can include an ecosystem—hereinafter referred to as—external data processing system and an industrial data processing system—hereinafter referred to as—internal data processing system. The internal data processing system can use the external data processing system's infrastructure in order to perform certain tasks.

Industrial/internal data processing system comprises or consists an industrial or internal computer network (networks) of the industrial plant or of a plurality of industrial plants. The external data processing system comprises or is a computer network, e.g. a public computer network, which is external with respect to the industrial or internal computer network.

Various data of an industrial plant, which can be a part of the industrial/internal data processing system is regularly stored and made available in local and/or internal industrial plant networks. These networks are commonly isolated from public networks, because the stored data such as machine, production, planning or scheduling data is sensitive or confidential and can contain information about production methods and processes. This data is routinely used to control, monitor and supervise production flows and processes. Therefore, it can be of advantage not to disclose or to transfer such data to external entitles in the external data processing system, i.e. entities outside of the private industrial plant networks, e.g. intranets. Conversely, a direct access to the data by the external entities is often undesirable, because it is associated with certain risks.

For the reasons above there are technical measures that are intended to ensure safety of the internal or confidential data in the private industrial plant networks. An example of such technical measure is a firewall, e.g. a network-based firewall, which is positioned, e.g. on a gateway between the local industrial plant network and a public (untrusted) network, such as Internet or a cloud. A further technical measure can involve a type of a tunneling protocol, such as VPN tunneling protocol, in order to extend the internal/private industrial network across the public network and to enable communication between devices across the public network, as if these devices were directly connected to the internal industrial network in order to intercommunicate with and, in particular, to exchange data with the internal industrial network.

It is known from the prior art to arrange industrial edge devices on the "edge" between the private industrial plant network and the external/public network. The industrial edge devices are located within the internal industrial network and, on the one hand, provide (at least some) resources for data processing within the internal industrial network and, on the other hand, provide the data from the internal data processing system to an external entity, such as cloud-based solution, an edge backend device or alike. The industrial edge devices can be also adapted to acquire this data from one or more industrial machines, e.g. machine tools, and/or one or more processes of the industrial plant. Conversely, the industrial edge devices are adapted to receive data and commands from external entities and to apply or implement these in the internal industrial network.

As long as the provider of the external entity or of the external data processing system or of the entire ecosystem and the operator of the internal industrial network are identical or there exist a special relationship of loyalty and confidentiality between them, the data exchange between the external and the internal data processing systems can be planned and carried out amicably.

It will be appreciated by the skilled person that the term "internal data processing system" means an industrial data processing system, which is internal with respect to the entire ecosystem, e.g. to the external data processing system. It will be appreciated that such industrial data processing system can be realized as hard- or software or, more often, as a combination of hard- and software, wherein the hard- and/or software of such "internal data processing system" can e.g. belong to the same legal entity or to a group of associated legal entities, e.g. to a corporate group.

A problem arises if certain industrial plant related data, e.g. production-related data is not allowed to leave the internal, e.g. local industrial network but, at the same time is needed to be provided to the external entity or entitles, in order to enable business models, optimizations and alike.

Such situation is possible, if for example an original equipment manufacturer provides an industrial machine to an operator of an industrial plant and the parties agree on a so-called pay-per-use payment model, where the operating time or the number of production operations or alike shall be remunerated. The original equipment manufacturer and the owner of the industrial machine has, therefore, a legitimate interest in obtaining data, on a regular, e.g. monthly basis, about the use and the utilization of the industrial machine, in order to correctly bill the operator and to monitor all maintenance related events, e.g. overloading. The operator of the industrial plant, however, is not willing to expose himself by giving away sensitive data and maybe disclosing confidential information such as information about production cycles, order peaks and stagnations, types and design of produced products and alike. Therefore, there is a conflict of interest between the provider of the external data processing system and the operator of the internal data processing system.

It will be appreciated by the skilled person that the operator can be an automated apparatus such as a robot or an artificial intelligence, which e.g. can execute and monitor apps on one or more industrial machines.

It will be appreciated by the person skilled in the art, that the provider of the external data processing system and the provider of the entire ecosystem can be different entities. The provider of the external data processing system can be for example a provider of an application software—app—for industrial machines, which software for example, based on the utilization data of the machines optimizes their usage. This app can be stored and run in a cloud, which is a part of an ecosystem, provided by yet another party.

It will also be appreciated, that the provider of the entire ecosystem, the provider/owner of the internal data processing system, e.g. an application software—app—and the operator can be different entities, in particular, different legal entities. The operator can run an app from the ecosystem on the industrial edge device or devices located in the internal data processing system.

Accordingly, there is a need to provide a communication scheme suitable for an untrusted industrial setting.

SUMMARY OF THE INVENTION

In order to achieve the objective mentioned above, the present invention provides a method for providing data from an internal data processing system of an industrial plant, particularly of an automated industrial plant to an external data processing system. The internal data processing system comprises at least one industrial edge device, at least one, particularly a plurality of, industrial machine(s) and at least one data processing module. The at least one data processing module is provided with a, for example certified, in particular, certified by a third trusted party, user-defined data filter. The method comprises: generating a plurality of data packets, e.g. unencrypted data packets, from or based on a data related to the at least one industrial machine by means of the at least one industrial edge device, and signing each data packet of the plurality of for example unencrypted data packets with a first digital signature, in order to produce a plurality of signed data packets, particularly a plurality of the signed read-only data packets by means of the at least one industrial edge device, in particular, by means of each of the industrial edge devices. The method further comprises reading each signed data packet of the plurality of the signed data packets and, while reading, either letting through those signed data packets that pass the user-defined data filter or rejecting those signed data packets that fail to pass the user-defined data filter. This is done by means of the data processing module. The method also comprises sending all those data packets that have passed the user-defined data filter towards the external data processing system.

Signing with the first digital signature can be performed (locally) on a corresponding industrial edge device. In some embodiments the signing with the first digital signature can be performed remotely, e.g. by a software component, e.g. a license manager, which is not co-located with the industrial edge device(s) and/or the industrial plant and can be accessed by the industrial edge device(s) in order to perform the signing with the first digital signature.

The data related to the at least one industrial machine can be for example (raw) data extracted/derived from the at least one industrial machine by means of the at least one industrial edge device, which is, in particular, associated with the at least one industrial machine.

Therefore, in some embodiments, generating the plurality of data packets based on a data related to the at least one industrial machine can comprise a sub-step of extracting data from the at least one industrial machine.

In an embodiment at least some of the data packets, more particularly, all data packets are logfiles.

The data related to the at least one industrial machine can also be a data generated on the at least one industrial edge device. Such data can be based e.g. on edge platform data and/or edge app infrastructure data and/or billing data and/or licensing data etc. Such data can be produced/generated on the at least one industrial edge device by analyzing and processing data from the at least one industrial machine and/or from another (raw) data source within the internal data processing system, e.g. data generated by workflows through software applications (edge device apps) being processed by edge device or edge devices. Such data can be generated by an edge device app that receives data from another edge app, which receives its data from an industrial machine.

In some embodiments the data related to the at least one industrial machine can be based on an infrastructure data, e.g. edge logfiles or on information about how frequently an edge device or an app on the edge had a malfunction or on billing information for pay-per-use of the edge apps etc.

Therefore, in some embodiments, the plurality of data packets can be generated based on a billing data and/or licensing data related to the at least one industrial machine. The billing data and/or licensing data can be related to the use of the industrial machine itself or to the use of an app, which can some tasks and process some functions related to this industrial machine.

The signing of the data packets of the plurality of, in particular unencrypted, data packets with the first digital signature can be performed by means of the at least one industrial edge device, on which this data packets are generated. In this case the signing with the first digital signature is done by the ecosystem provider, e.g. manufacturer of the industrial edge devices.

It will be appreciated by the person skilled in the art that the above steps can be repeated for any industrial edge device.

In an embodiment the letting through those signed data packets that pass the user-defined data filter can comprise signing these signed data packets with a second digital signature (before sending them towards the external data processing system), in order to produce double-signed data packets. This increases the data authenticity and end-to-end data integrity. Signing by the second digital signature can be performed e.g. by the above-mentioned operator of the internal data processing system, wherein the operator can perform the signing from the ecosystem, while e.g. running an app or apps on one or more industrial edge devices located in the internal data processing system.

In some embodiments signing with the second digital signature can be performed not on the industrial edge devices but by means of another part of the internal data processing system, for example by a certificate authority. Such certificate authority does not have to be co-located with the industrial plant. E.g. it can be realized as a software in the cloud-part of the internal industrial network of the internal data processing system.

In some embodiments the method can further comprise validating the first digital signature of each data packet or noting the packet's absence by means of the external data processing system.

In some embodiments the method can further comprise storing a first key at the external data processing system, wherein the first key corresponds to the first signature and is used to validate it.

In some embodiments the method can further comprise encrypting each signed data packet by means of the at least one industrial edge device.

In some embodiments the internal data processing system can further comprise at least one gateway component and the method can further comprise sending all those data packets that have passed the user-defined data filter towards the external data processing system through the at least one gateway component.

In an embodiment, in which the data processing module signs the signed data packets with the second digital signature, the sending all double-signed data packets towards the external data processing system through the at least one gateway component can comprise following partial steps sending all double-signed data packets to the at least one gateway component;

validating the second digital signature of each of the double-signed data packets by means of a second key, wherein the second key corresponds to the second digital signature;

sending all validated double-signed data packets to the external data processing system.

In some embodiments the second key can be interrogated by the gateway component, so that the validating the second digital signature can be performed by means of the gateway component. It can be for example stored on the at least one gateway component itself or at some different place within the internal data processing system but not within the industrial plant, which can be accessed by the at least one gateway component.

In some embodiments the second key can be stored within the internal industrial network but not on a physical device within the industrial plant. E.g. the second key can be stored in a cloud (a cloud-part of the internal industrial network, which is a part of internal data processing system), such that validating the second digital signature can be performed for example by an app in the cloud.

In an embodiment the sending all double-signed data packets towards the external data processing system through the at least one gateway component can further comprise encrypting each of the double-signed data packets.

In one of the embodiments the user-defined data filter can be implemented as a whitelist that contains allowed terms detectable in the content of the data packets, in particular, by finding the terms by searching for the term's text and/or applying image classification and/or object detection and/or mapping the objects detected in images to one or multiple terms.

In one of the embodiments the user-defined data filter is adapted to filter, e.g. to whitelist, the data packets based on the semantic content of the data, which data is contained in the data packets.

In an embodiment the data filter can be implemented as a whitelist that contains matchmaking patterns, in particular, regular expressions, particularly those that can be applied to the content of the data packets.

In order to achieve the objective mentioned above, also a data processing module for providing/filtering/whitelisting data from an internal data processing system of an industrial plant to an external data processing system is provided, wherein the internal data processing system comprises at least one industrial edge device and at least one (and in, particular, a plurality of) industrial machine(s), wherein the at least one industrial edge device is adapted/configured to generate a plurality of (in particular unencrypted) data packets related to the at least one industrial machine, and sign each data packet of the plurality of the data packets with a first digital signature, in order to produce a plurality of signed data packets, wherein the data processing module is provided with at least one, particularly certified, even more particularly certified by a third trusted party, user-defined data filter and adapted/configured to read each signed data packet of the plurality of the signed data packets and, while reading, apply the at least one user-defined data filter to it;

let through those signed data packets that pass the user-defined data filter or reject those signed data packets that fail to pass the user-defined data filter;

send all those data packets that have passed the user-defined data filter towards the external data processing system.

In an embodiment the data processing module can be also configured to sign those of the signed data packets that pass the at least one user-defined data filter with a second digital signature, in order to produce double-signed data packets and send all double-signed data packets towards the external data processing system.

In order to achieve the objective mentioned above, also an industrial data processing system is provided, which can be connected to an external data processing system, in order to exchange data with the external data processing system and comprises at least one industrial edge device, at least one, particularly a plurality of, industrial machine(s) and the at least one above-mentioned data processing module.

In an embodiment of the invention, the industrial data processing system can be realized as a combination of hard- and software components. In an embodiment the at least one industrial edge device of the internal data processing system can comprise at least one hardware controller configured to encrypt the data packets. In particular, the industrial data processing system can comprise a hardware controller, for example an FPGA (Field Programmable Gate Array).

BRIEF DESCRIPTION OF THE DRAWING

The above and other objects and advantages of the invention will be apparent upon consideration of the following detailed description, taken in conjunction with the accompanying drawings, in which like reference characters refer to like parts throughout, and in which.

DETAILED DESCRIPTION OF PREFERRED EMBODIMENTS

Figure 1:
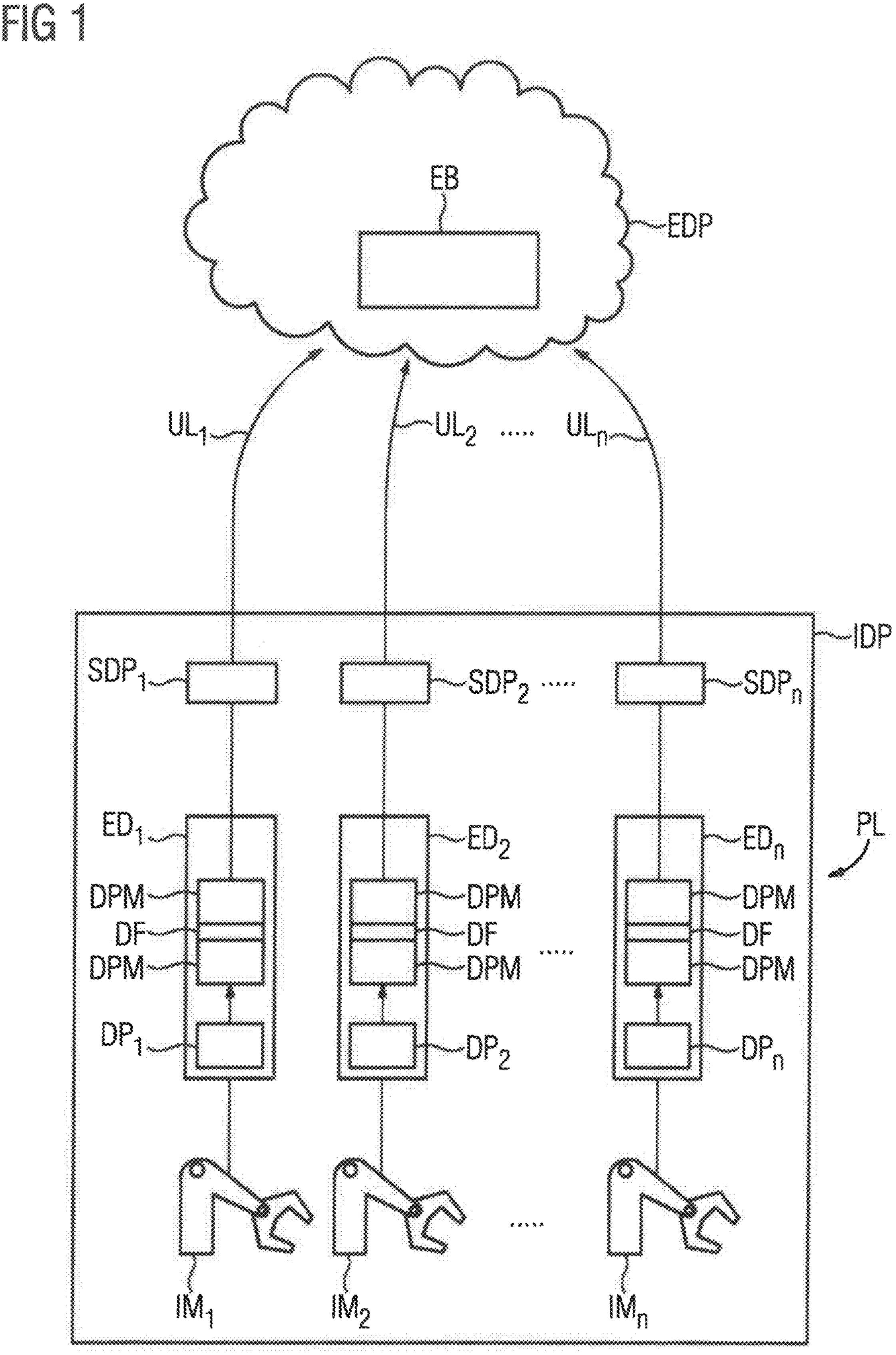
FIG. 1 is a block diagram of an example industrial network environment, in which embodiments with a plurality of industrial machines and industrial edge devices can be implemented.

Turning to FIG. 1, a block diagram of an example industrial network environment is shown. The industrial network environment can include an ecosystem—hereinafter referred to as—external data processing system EDP and an industrial IDP. The internal data processing system IDP can use the ecosystem's infrastructure in order to perform certain tasks. More particularly the external data processing system EDP can be a cloud-based external data processing system EDP (a cloud-based ecosystem). The external data processing system EDP can comprise a network environment—hereafter referred to as external network—for enabling communication for the entities of the ecosystem and computing devices and/or systems, e.g. backend devices EB or systems that are adapted to analyze data and perform analytics.

The internal data processing system IDP can comprise an industrial plant PL. It will be appreciated that the internal data processing system IDP can be a part of—a local data processing system of the industrial plant PL or co-located with the industrial plant PL. The industrial plant PL can be an automated industrial plant. The internal data processing system IDP can include a plurality of industrial machines IM1, IM2, . . . IMn, such as motors, robots, industrial equipment, automatization devices, and (a plurality of) Industrial edge ievices ED1, ED2, . . . EDn, wherein each industrial edge device can be connected to a single industrial machine IM1, IM2, . . . IMn and can intercommunicate with it in order to exchange data. Different industrial edge devices ED1, ED2, . . . EDn can be connected to different industrial machines IM1, IM2, . . . IMn. The industrial edge devices ED1, ED2, . . . EDn and the industrial machines IM1, IM2, . . . IMn can be co-located with the industrial plant PL (FIG. 1).

The industrial plant PL can be a manufacturing and/or testing facility, an industrial power plant, a facility for industrial plant engineering etc.

Industrial edge devices ED1, ED2, . . . EDn can be connected (for exchanging data, e.g. wirelessly) to a controller of the machine tool IM1, IM2, . . . IMn within the industrial plant PL and, therefore, co-located with the physical systems in the industrial plant environment. Industrial edge devices ED1, ED2, . . . EDn can be adapted to extract data from at least one of the plurality of the industrial machines IM1, IM2, . . . IMn. Moreover, the industrial edge devices ED1, ED2, . . . EDn can be adapted to provide (at least some) resources for data processing within the internal data processing system IDP of the industrial plant PL or—shortly—within the internal network of the industrial plant PL, for example within a factory LAN.

The industrial edge devices ED1, ED2, . . . EDn can be configured to produce/generate data packets DP1, DP2, . . . DPn, for example unencrypted data packets. The data packets can be generated (on industrial edge devices ED1, ED2, . . . EDn) based on a data related to one or more industrial machine(s) IM1, IM2, . . . IMn. In an embodiment at least one or a part of or all of the industrial edge devices ED1, ED2, . . . EDn can comprise a hardware component configured to encrypt the data packets DP1, DP2, . . . DPn. In particular, such hardware component can be a Field Programmable Gate Arrays (FPGA) controller. Such hardware components can increase the computing power of the industrial edge devices, because the resources needed for the encryption may be made available for performing other tasks, such as running apps.

For example the data packets can be generated based on a raw data, which is extracted from the industrial machines IM1, IM2, . . . IMn, and/or on a data related to the raw data, but was already analyzed and/or processed by one or more industrial edge device(s) ED1, ED2, . . . EDn, for example by means of a software application (of an edge app). Such app can for example use hardware resources of one or more of the industrial edge device(s) ED1, ED2, . . . EDn to process the raw data in order to generate the data packets DP1, DP2, . . . DPn. The data related to one or more industrial machine(s) IM1, IM2, . . . IMn can be also provided to the one or more industrial edge device(s) ED1, ED2, . . . EDn by the internal data processing system IDP, e.g. by a software component of the internal data processing system IDP, e.g. by another app, e.g. edge app, which can be processed on the same industrial edge device(s). The later type of data be based on the data workflow in the internal data processing system IDP, e.g. between the apps deployed on one or more industrial edge devices ED1, ED2, . . . EDn. It will be appreciated that the above-mentioned software components, such as apps or edge apps can be processed remotely, e.g. from the cloud, i.e. the user running a particular app does not have to be co-located with the industrial plant PL. In this way the internal data processing system IDP can use the infrastructure of the ecosystem.

The data related to the at least one industrial machine IM1, IM2, . . . IMn can be based e.g. on data or Edge platform and/or Edge app infrastructure and/or billing and/or licensing data etc.

FIG. 1 illustrates an example, where each single industrial edge device ED1, ED2, . . . EDn can be connected to/associated with a single industrial machine IM1, IM2, . . . IMn corresponding to that industrial edge device to intercommunicate and, in particular, exchange and/or receive/extract data from it. For sake of simplicity FIG. 1 depicts a situation, in which a single data packet DP1, DP2, . . . DPn is generated on each industrial edge device ED1, ED2, . . . EDn. It will be, however, appreciated that a plurality of the data packets can be generated on each of the industrial edge devices ED1, ED2, . . . EDn with time.

The industrial edge devices ED1, ED2, . . . EDn can be adapted to provide the data packets DP1, DP2, . . . DPn directly, i.e. without any further processing and/or passing through further devices, to an external entity in the external data processing system EDP (in the ecosystem). Such entity can be situated in the external data processing system EDP, e.g. In the cloud, and can be for example an external software application—an app—or a cloud-based solution or an edge backend EB. In this situation each industrial edge device ED1, ED2, . . . EDn serves as a gateway agent, for example as an IoT gateway. This can be the case, when the entire industrial network environment, including the communication channel between the internal and the external data processing system, e.g. edge-to-cloud communication channel, can be completely trusted. The industrial edge devices ED1, ED2, . . . EDn can be also adapted to encode/encrypt the data packets DP1, DP2, . . . DPn before sending them via one or more uplinks UL1, UL2, . . . ULn to the external data processing system EDP, e.g. to the external entity, e.g. an edge backend EB, in the external data processing system EDP. This can be of advantage, if the communication channel between the internal data processing system IDP and the external entity in the external data processing system EDP or the external data processing system EDP itself cannot be fully trusted.

The data packets DP1, DP2, . . . DPn can have different structure. In general, they can be unstructured, semi-structured and structured. For example, the data packets DP1, DP2, . . . DPn can be logfiles.

In some scenarios, especially in untrusted situations, the data packets DP1, DP2, . . . DPn from the industrial edge devices ED1, ED2, . . . EDn can go through a separate gateway device GW (FIG. 3 and FIG. 4) before they leave the internal network of the internal data processing system IDP, e.g. the local network of the industrial plant PL. This can be motivated by security reasons, because it is more feasible to monitor one upload link instead of n, where n is the number of the edge devices.

Before being provided to the external entity, such as backend device EB in the external data processing system EDP the data can be as well pre-processed/processed, e.g. encrypted and/or signed by the industrial edge devices ED1, ED2, . . . EDn. Moreover, the industrial edge devices ED1, ED2, . . . EDn can be adapted to receive data from the external data processing system EDP. Such data can comprise data from an external application software—apps, and/or commands from an external entity and/or firmware updates etc. The industrial edge devices ED1, ED2, . . . EDn can be adapted to implement/apply the received data accordingly within the internal data processing system IDP of an industrial plant PL.

As described above there are, however, situations, where only a very low level of trust is allowable, because sensitive and/or confidential data is contained in the data packets DP1, DP2, . . . DPn.

For that reason, at least one data processing module DPM is provided. The data processing module DPM is contained in the internal data processing system IDP and can be a separate network component or a software module, particularly a software component, more particularly a plugin, which can be installed on a network component, such as a proxy-server, a gateway component or an industrial edge device of the internal data processing system IDP and can be implemented by this network component. More particularly, the data processing module DPM can be co-located with the industrial plant PL.

The at least one data processing module DPM is provided with a user-defined data filter DF. The user-defined data filter DF can be certified, for example certified by a third trusted party. The term "user-defined" means that the data filter DF is defined by the user of the provided product, in the current context—by the operator of the industrial plant PL. The user-defined data filter DF contains information about, which data is allowed to leave the internal data processing system IDP and which is not. The user-defined data filter DF can be a whitelist. Therefore, in an embodiment the data processing module DPM can be a whitelisting plugin with a user-defined data filter DF in form of a whitelist. The user-defined data filter DF and/or data processing module DPM can be certified. The certification can be performed by the provider of the industrial machine IM1, IM2, . . . IMn and of the industrial edge device ED1, ED2, . . . EDn and/or by the provider of the external entity, e.g. by the provider of the application software or by an independent trusted third party TC (cf. FIG. 4), such as German technical inspection association (TOV).

For example, the user-defined data filter DF can comprise a list of words and/or matchmaking patterns (e.g. regular expressions, also called "searchpatterns", matching allowed terms) and/or object descriptions (if data packets contain images). The data processing module DPM can for example use neuronal networks for object recognition in recorded images and, when an object, e.g. a spindle or a spindle nose, is recognized, compare it with the content of the user-defined data filter DF. Then, if for example the form of a spindle is an industrial secret, then the corresponding data packet containing a picture of the spindle can be blocked by the data processing module DPM.

Figure 2:
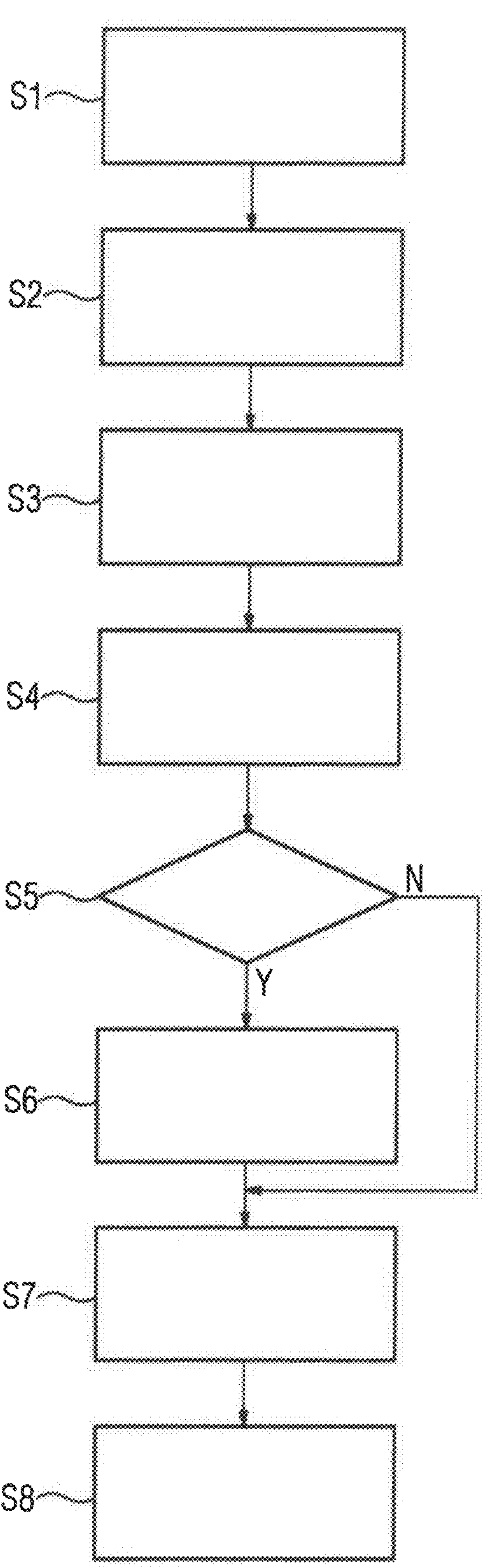
FIG. 2 is a flow diagram of an example of a method for providing data from an internal data processing system of an industrial plant to an external data processing system.

Turning to FIG. 2, an example of a method for providing data from the internal data processing system IDP of the industrial plant PL to the external data processing system EDP is illustrated.

In the first step S1 of the method raw data can be extracted from the at least one industrial machine IM1, IM2, . . . IMn. From this data a plurality of data packets DP1, DP2, . . . DPn can be produced—step S2. At this stage the data packets can be encrypted or unencrypted. Each data packet DP1, DP2, . . . DPn can be signed with a first digital signature PR1, in order to produce a plurality of signed data packets—step S3. The steps S1 to S3 can be performed by means of the industrial edge devices ED1, ED2, . . . EDn. Step S3 assures that the data comes from the industrial machines IM1, IM2, . . . IMn (authentication) and, when the signature is verified, was not altered in transit (Integrity).

As discussed above generating the plurality of the data packets DP1, DP2, . . . DPn can also be based on a data provided by edge apps and related to the one or more industrial machines IM1, IM2, . . . IMn. In this way the edge apps can generate new process relevant data, which can be further processed in form of data packets DP1, DP2, . . . DPn.

Furthermore, the plurality of the data packets DP1, DP2, . . . DPn can be generated based on an infrastructure data, e.g. edge logfiles or on information about how frequently an edge device or an app on the edge had a malfunction or on billing information for pay-per-use of the edge apps etc. This information can be of interest to the ecosystem provider and/or to edge app developer and/or to the manufacturer of the industrial machines.

Each signed data packet can then be forwarded to the data processing module DPM, which can e.g. read them (step S4) and compare their content with the content of the user-defined data filter DF, wherein the content of the user-defined data filter DF can comprise list(s) of words (whitelist(s)), matchmaking patterns or object descriptions. The data processing module DPM can also apply matchmaking patterns of the data filter's DF whitelist to the content to get filtered data that matches the patterns.

If the data processing module DPM determines that there is no sensitive data and/or confidential information contained in the particular signed data packet, it lets the signed data packet through—arrow Y after step S5. In an embodiment the data processing module DPM can sign the signed data packet with a second digital signature PR2 and produce a double-signed data packet SDP1, SDP2, . . . SDPn—step S6. This can be done to assure the integrity of the data, which passes the user-defined data filter DF. The signing can be performed by a hardware component, e.g. by a FPGA controller.

If, while comparing the content of a particular signed data packet with the user-defined data filter DF, the data processing module DPM determines that the signed data packet contains sensitive data, it can reject it—arrow N after step S5. The term rejection can mean for example that the signed data packet is not forwarded further or that the data processing module DPM marks this data packet, e.g. by a mark "DENY" and processes it further, but only within the internal data processing system IDP, particularly only within the local network of the industrial plant PL.

The first digital signature PR1 can be owned by the provider of the industrial machines IM1, IM2, . . . IMn and/or by the provider of the industrial edge devices ED1, ED2, . . . EDn and/or by the ecosystem provider. The second digital signature PR2 can be owned by the owner of the data processing module DPM and/or by the owner of the user-defined data filter DF (usually by the industrial plant PL owner/operator). Both signatures can be provided by a corresponding authority within the external data processing system EDP or within the internal data processing system IDP accordingly. In an embodiment both digital signatures PR1, PR2 are provided by an independent trusted entity, such as trust center TC illustrated in FIG. 4. The trust center TC can be for example TOV.

All data packets that pass the user-defined data filter DF, e.g. the double-signed data packets SDP1, SDP2, . . . SDPn can then be sent towards the external data processing system EDP—step S7.

In an embodiment signing with the first and/or second digital signature can be performed by means of a hardware component, e.g. by an FPGA controller.

In some embodiments the data processing module DPM can be a plugin installed on each industrial edge device ED1, ED2, . . . EDn. The double-signed data packets SDP1, SDP2, . . . SDPn can be, therefore, provided to the corresponding industrial edge device ED1, ED2, . . . EDn for further processing, e.g. encryption. It will be appreciated by the person skilled in the art that the data processing module DPM can be designed as a network component, which can be designed separately from the industrial edge device(s) ED1, ED2, . . . EDn.

In an embodiment the data processing module DPM can encrypt the double-signed data packets.

The first digital signature PR1 of each data packet that passed the user-defined data filter DF, and can be for example signed with the second digital signature PR2, i.e. the double-signed data packet SDP1, SDP2, . . . SDPn, can be validated within the external data processing system EDP—S8, for example by the original equipment manufacturer (provider of the industrial machines) or by the provider of the industrial edge devices or by the provider of the software application that is carried out on the industrial edge devices. An absence of the data packets from the internal data processing system IDP can be noted by the external data processing system EDP for control purposes. In this way it is possible for example to conclude that the user-defined data filter DF does not perform in a proper way. This can be due to an ill-defined content of the user-defined data filter DF, e.g. an ill-defined whitelist and/or matchmaking pattern and/or object description, which can result in preventing all data from being uploaded into the external data processing system EDP, e.g. into the cloud.

Figure 4:
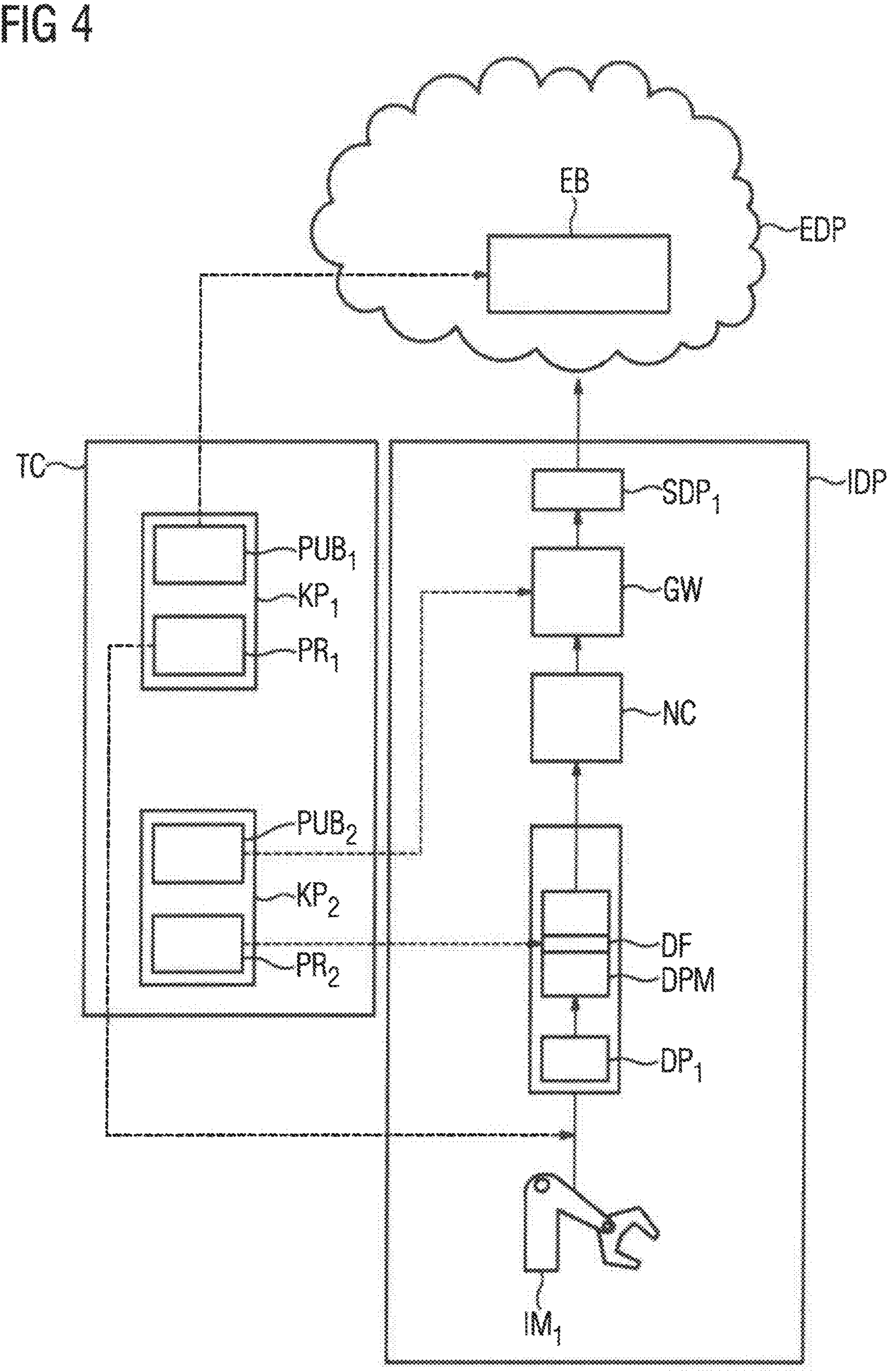
FIG. 4 is a block diagram of an example industrial network environment and a third trusted party for providing key pairs.

An embodiment of the method includes storing of a first key PUB1 at the external data processing system EDP, wherein the first key PUB1 corresponds to the first signature PR1 and can be used to validate it (at any time in the future). This validation can be performed for example by means of the edge backend device EB. FIG. 4 illustrates that the first key PUB1 can be provided to the edge backend device EB.

Figure 3:
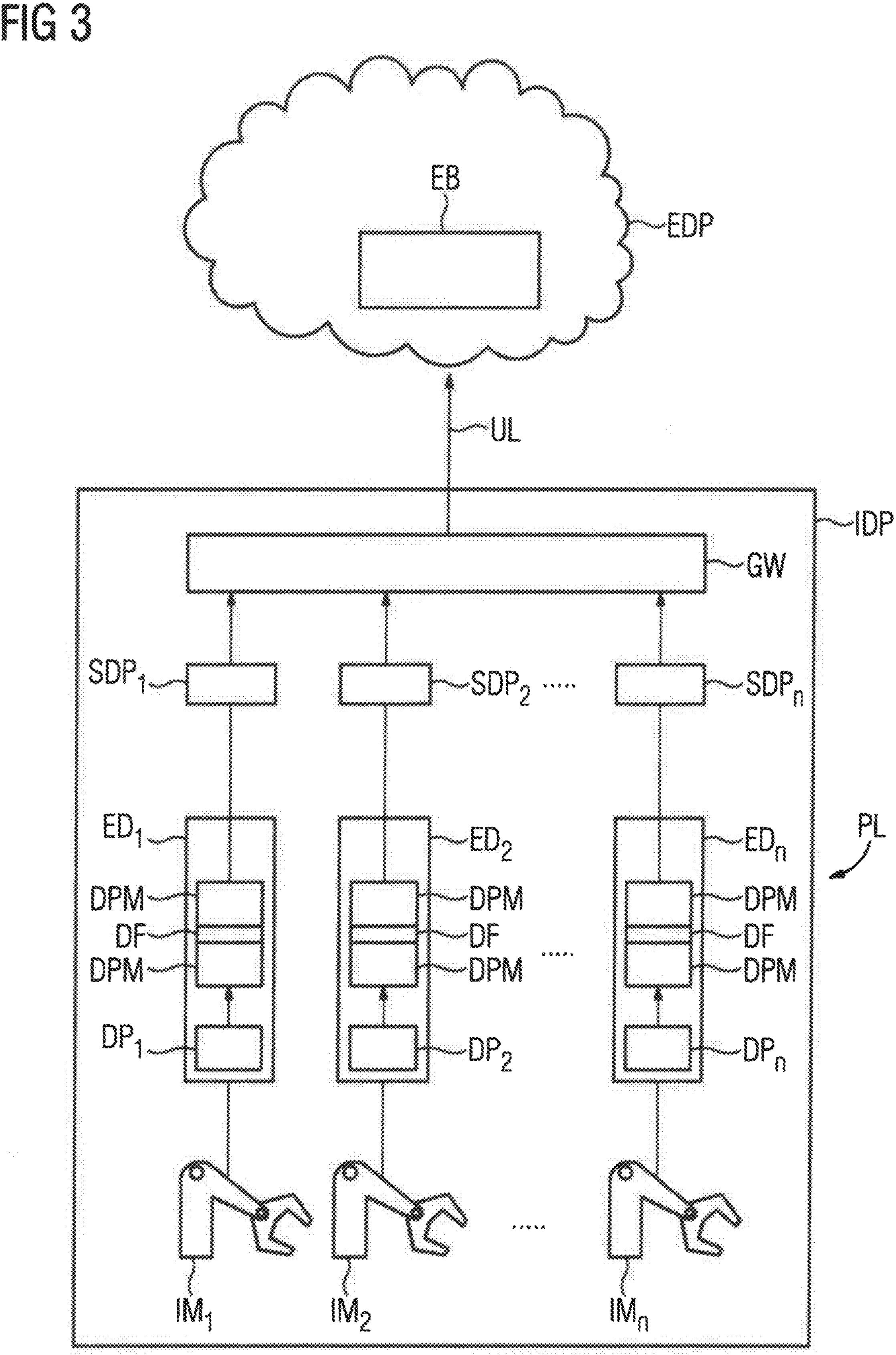
FIG. 3 is a block diagram of an example industrial network environment with a single gateway component between an internal and an external network.

As mentioned earlier, the internal data processing system IDP can further comprise the gateway component GW and all data packets that pass the user-defined data filter DF can be sent towards the external data processing EDP system through the at least one gateway component GW. FIGS. 3 and 4 show that these packets can be signed with the second digital signature PR2 before reaching the gateway GW.

The gateway component GW can be controlled by the industrial plant PL owner. If the data packets are signed by the data processing module DPM with the second digital signature PR2, the gateway component GW can be provided with a second key PUB2 for verifying the second digital signature PR2. In some embodiments the verification of the second digital signature PR2 can be performed somewhere in the internal data processing system IDP but outside of the gateway component GW. In an embodiment the verification of the second digital signature PR2 can be performed by an app within the internal network of the internal data processing system IDP. Such app can for example remotely access the gateway component GW in order to perform the verification. Verifying the second digital signature PR2, e.g. by the gateway component GW, increases overall security of the scheme. In case of positive verification, the double-signed data packets SDP1, SDP2, . . . SDPn can be sent to the external data processing system EDP, via an uplink UL, e.g. by the gateway component GW or by the app, which remotely accesses the gateway component GW for verifying the second digital signature PR2. In an embodiment the double-signed data packets SDP1, SDP2, . . . SDPn can be sent to the edge backend device EB.

In some embodiments the gateway component also can prevent the data packets marked with "DENY" from leaking outside of the internal network of the internal data processing system IDP, in particular, outside of the local network of the industrial plant PL.

In some embodiments the gateway component GW encrypts the data packets, for example the double-signed data packets, before sending them to the external data processing system EDP.

In an embodiment the encryption can be performed by an additional hardware component, e.g. FPGA controller.

As Illustrated in FIG. 4, in some embodiments the internal data processing system IDP can comprise a further network component NC. This component can be located within the local network of the industrial plant PL, for example between the industrial edge devices ED1, ED2, . . . EDn and the gateway component GW. The network component NC can be a proxy-server. The data processing module DPM, e.g. the plugin can be installed on the network component NC. In some embodiments the digital signatures (private keys) PR1, PR2 can be provided by a third trusted party, e.g. by a trust center TC. In this scenario the trust center TC can generate at least two key pairs KP1, KP2 for the provider of the industrial edge devices ED1, ED2, . . . EDn and for the user (owner) of the industrial plant PL accordingly. The public keys PUB1, PUB2 for verification of the digital signatures PR1, PR2 can be provided as well.

The above described embodiments of the present disclosure are presented for purposes of illustration and not of limitation. In particular, the embodiments described with regard to figures are only few examples of the embodiments described in the introductory part.

The reference signs in the claims used only for clarity purposes and shall not be considered to be a limiting part of the claims.

What is claimed is:

1. A method for providing data from an internal data processing system of an industrial plant to an external data processing system external to the industrial plant, wherein the internal data processing system comprises a plurality of industrial edge devices each having at least one data processing module and a user-defined data filter, and a plurality of industrial machines, wherein each single industrial edge device is associated with a different single industrial machine, the method comprising:

with each of the industrial edge devices, generating a plurality of data packets from data related to each of the associated industrial machines, and with each of the industrial edge devices, signing each data packet of the plurality of data packets with a first digital signature, thus producing a plurality of signed data packets;

with each of the data processing modules and user-defined data filters, reading each signed data packet of the plurality of the signed data packets and, while reading, applying the user-defined data filter to each signed data packet to determine if each of the signed data packets contains sensitive data and/or confidential information, letting through those signed data packets that contain no sensitive data and/or confidential information and pass the user-defined data filter and sending all those data packets that have passed the user-defined data filter towards the external data processing system;

rejecting those signed data packets that contain sensitive data and/or confidential information and fail to pass the user-defined data filter and not forwarding further the rejected signed data packets so that the rejected signed data packets remain within the internal data processing system; and producing double-signed data packets by signing the signed data packets that pass the user-defined data filter with a second digital signature.

2. The method of claim 1, further comprising sending the data packets that have passed the user-defined data filter towards the external data processing system through at least one gateway component of the internal data processing system.

3. The method of claim 1, further comprising sending the double-signed data packets towards the external data processing system through at least one gateway component of the internal data processing system by sending the double-signed data packets to the at least one gateway component;

validating the second digital signature of each of the double-signed data packets by a second key that corresponds to the second digital signature; and sending the validated double-signed data packets to the external data processing system.

4. The method of claim 3, wherein sending the double-signed data packets further comprises encrypting each of the double-signed data packets.

5. The method of claim 1, further comprising, with the external data processing system, validating the first digital signature of each data packet or noting a packet's absence.

6. The method of claim 5, further comprising storing a first key that corresponds to the first signature at the external data processing system, and is using first key to validate the first signature.

7. The method of claim 1, further comprising encrypting each signed data packet by using each industrial edge device.

8. The method of claim 1, wherein the internal data processing system further comprises at least one gateway component, the method further comprising sending all those data packets that have passed the user-defined data filter towards the external data processing system through the at least one gateway component.

9. The method of claim 1, wherein each user-defined data filter is implemented as a whitelist that contains allowed terms detectable in the content of the data packets, in particular by finding the terms by searching for at least one of the term's text, applying image classification, object detection and mapping objects detected in images to one or multiple terms.

10. The method of claim 1, wherein the user-defined data filter is implemented as a whitelist that contains matchmaking patterns, in particular regular expressions, particularly those that can be applied to the content of the data packets.

11. An industrial network comprising an internal data processing system of an industrial plant and an external data processing system external to the industrial plant, wherein the internal data processing system comprises a plurality of industrial edge devices each having at least one data processing module and a user-defined data filter, and a plurality of industrial machines, wherein each single industrial edge device is associated with a different single industrial machine, wherein each one of the industrial edge devices is adapted to generate a plurality of data packets from data related to each of the associated industrial machines, and with each of the industrial edge devices, sign each data packet of the plurality of data packets with a first digital signature, thus producing a plurality of signed data packets, with each of the data processing modules and user-defined data filters, read each signed data packet of the plurality of the signed data packets and, while reading, apply the at least one user-defined data filter to each signed data packet to determine if each of the signed data packets contains sensitive data and/or confidential information;

let through those signed data packets that contain no sensitive data and/or confidential information and pass the user-defined data filter and send all those data packets that have passed the user-defined data filter towards the external data processing system;

reject those signed data packets that contain sensitive data and/or confidential information and fall to pass the user-defined data filter and not forward further the rejected signed data packets so that the rejected signed data packets remain within the internal data processing system; and produce double-signed data packets by signing the signed data packets that pass the user-defined data filter with a second digital signature.

12. The industrial network of claim 11, wherein each industrial edge device is adapted to generate a plurality of unencrypted data packets from data related to the at least one industrial machine.

13. The industrial network of claim 11, wherein each user-defined data filter is certified.

14. The industrial network of claim 11, wherein each user-defined data filter is certified by a third trusted party.

15. The industrial network of claim 11, wherein each industrial edge device comprises at least one hardware controller configured to encrypt the data packets.

16. The industrial network of claim 15, wherein the at least one hardware controller is a Field Programmable Gate Array controller.

17. A computer program stored on a non-transitory computer-readable medium and comprising instructions which when stored in a memory of an internal data processing system of an industrial plant comprising a plurality of industrial edge devices each having at least one data processing module and a user-defined data filter, a plurality of industrial machines, wherein each single industrial edge device is associated with a different single industrial machine, and executed by a processor of the internal industrial data processing system, causes the internal industrial data processing system to provide data from the internal data processing system to an external data processing system external to the industrial plant, with each of the industrial edge devices, generate a plurality of data packets from data related to each of the associated industrial machines, with each of the industrial edge devices, sign each data packet of the plurality of data packets with a first digital signature, thus producing a plurality of signed data packets;

with each of the data processing modules and user-defined data filters, read each signed data packet of the plurality of the signed data packets and, while reading, apply the user-defined data filter to each signed data packet to determine if each of the signed data packets contains sensitive data and/or confidential information, let through those signed data packets that contain no sensitive data and/or confidential information and pass the user-defined data filter and send all those data packets that have passed the user-defined data filter towards the external data processing system;

reject those signed data packets that contain sensitive data and/or confidential information and fail to pass the user-defined data filter and not forward further the rejected signed data packets so that the rejected signed data packets remain within the internal data processing system; and produce double-signed data packets by signing the signed data packets that pass the user-defined data filter with a second digital signature.

18. The industrial network of claim 11, further comprising sending the double-signed data packets towards the external data processing system through at least one gateway component of the internal data processing system by sending the double-signed data packets to the at least one gateway component;

validating the second digital signature of each of the double-signed data packets by a second key that corresponds to the second digital signature; and sending the validated double-signed data packets to the external data processing system.

19. The Industrial network of claim 18, wherein sending the double-signed data packets further comprises encrypting each of the double-signed data packets.

20. The computer program stored on a non-transitory computer-readable medium of claim 17, further comprising sending the double-signed data packets towards the external data processing system through at least one gateway component of the internal data processing system by sending the double-signed data packets to the at least one gateway component;

validating the second digital signature of each of the double-signed data packets by a second key that corresponds to the second digital signature; and sending the validated double-signed data packets to the external data processing system.

21. The computer program stored on a non-transitory computer-readable medium of claim 20, wherein sending the double-signed data packets further comprises encrypting each of the double-signed data packets.

* * * * *